J. A. JONES.
HEAD LAMP CONTROL FOR MOTOR VEHICLES.
APPLICATION FILED JAN. 6, 1917.
1,226,529.
Patented May 15, 1917.
2 SHEETS—SHEET 1.
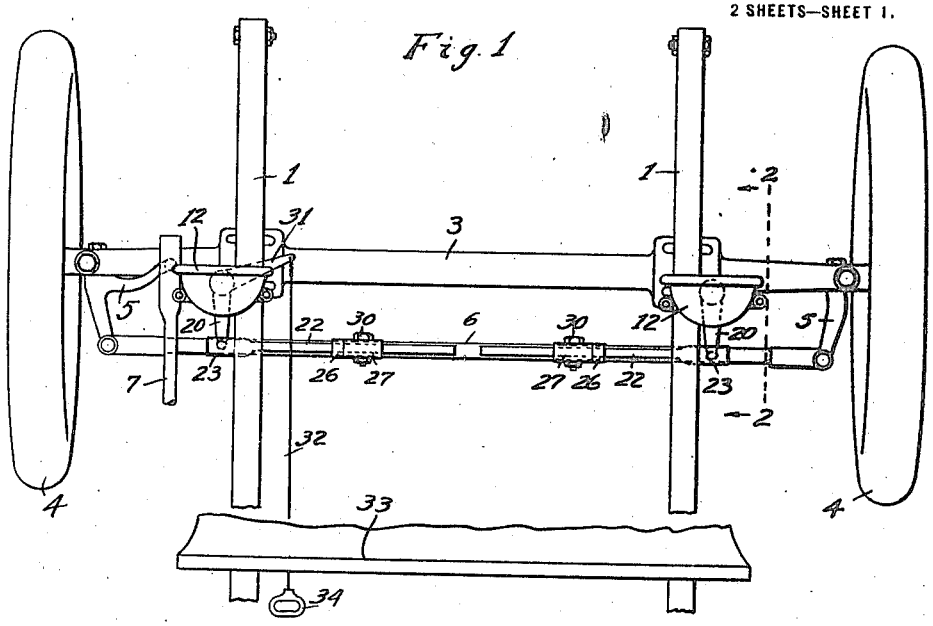
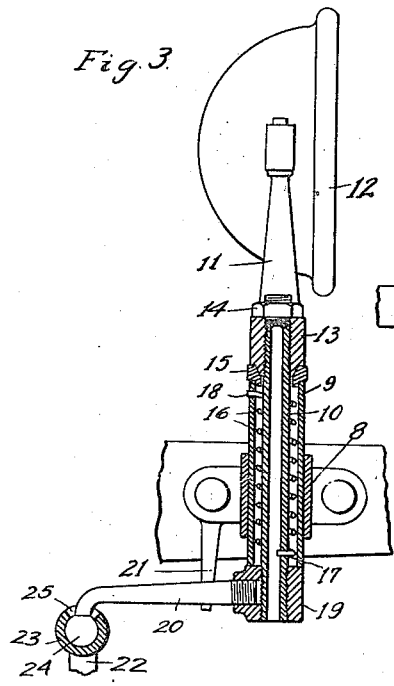
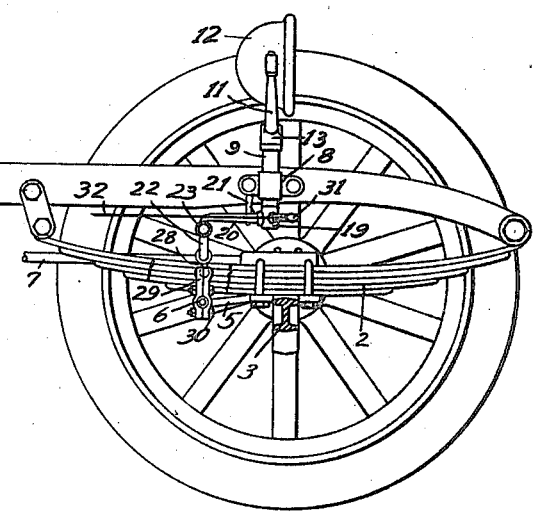
INVENTOR
J Albert Jones
BY
ATTORNEY J A. JONES.
HEAD LAMP CONTROL FOR MOTOR VEHICLES.
APPLICATION FILED JAN. 6, 1917.
1,226,529.
Patented May 15, 1917.
2 SHEETS—SHEET 2.
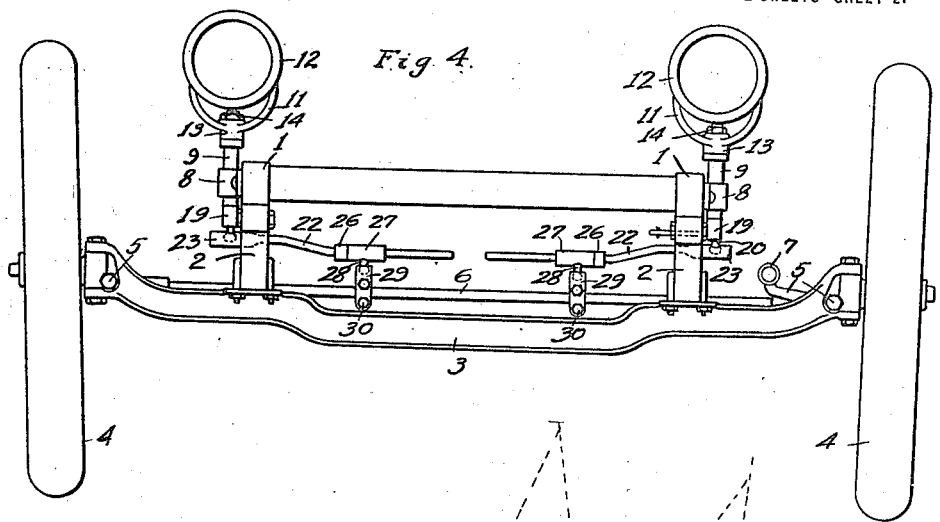
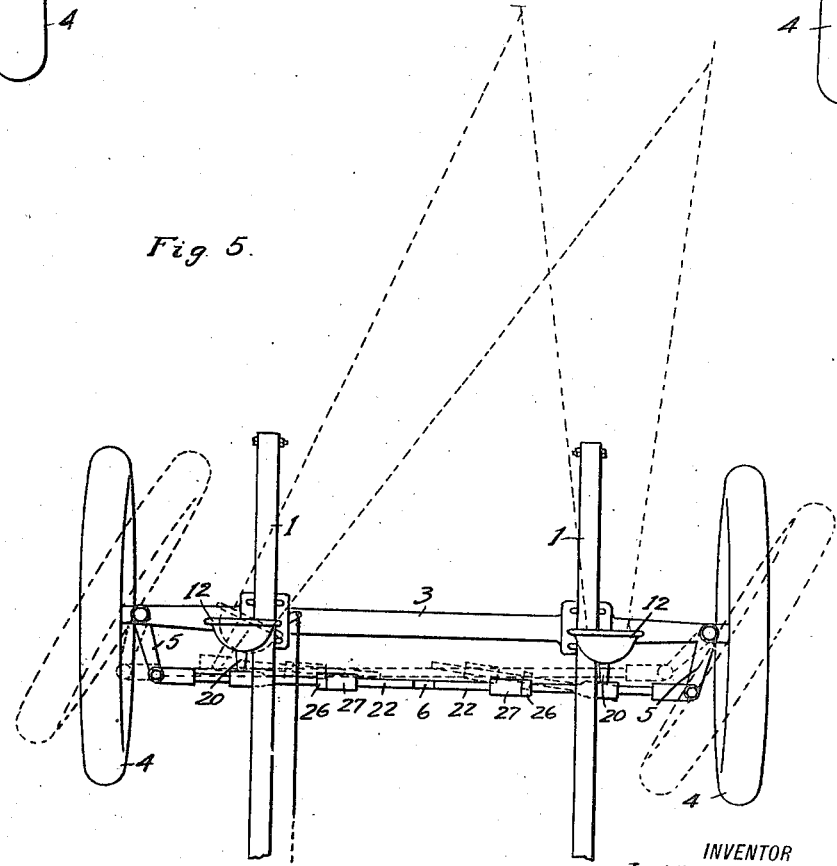
INVENTOR
J Albert Jones
ATTORNEY

UNITED STATES PATENT OFFICE.

J ALBERT JONES, OF MARCELLUS, MICHIGAN.

HEAD-LAMP CONTROL FOR MOTOR-VEHICLES.

1,226,529.

Specification of Letters Patent.

Patented May 15, 1917.

Application filed January 6, 1917. Serial No. 140,927.

*To all whom it may concern:*

Be it known that I, J ALBERT JONES, a citizen of the United States, residing at Marcellus, in the county of Cass and State of Michigan, have invented a new and useful Head-Lamp Control for Motor-Vehicles, of which the following is a specification.

This invention relates to means for controlling the head lamps of motor-vehicles, and it consists in the novel features of construction and operation as hereinafter set forth and claimed.

The invention has for its object the provision of simple and improved means for operably mounting and connecting the head lamps of a motor vehicle with the front wheel steering gear so as to actuate said lamps alternately in opposite directions simultaneously with the movement of said wheels through the operation of the steering gear, and in such manner as to turn said lamps independently and respectively in directions corresponding to the angle of deflection of the course of the vehicle, so that the rays of light from the lamp so turned will be directed at an angle converging with the forwardly projecting rays from the companion lamp in its normal position, whereby the light from both lamps will be concentrated and distributed upon the roadway over the outermost area of the arc of the turning course of the vehicle, thus effectively illuminating the outer contour of the roadway in advance of the travel of the vehicle when turning to either the right or left to guide the driver in following the road.

Provision is further made to enable one of the lamps, preferably that on the driver's side of the vehicle, which is usually the left side, to be manually operated so as to deflect the light therefrom diagonally across the roadway toward the right and out of range with an approaching or passing vehicle, to prevent the glare of the light from blinding or confusing the vision of the driver of such vehicle.

A preferred structural arrangement and embodiment of the essential features of the present invention by which the above objects are attained is illustrated in the accompanying drawings, in which, Figure 1 is a plan view of the front portion of a common type of motor vehicle, showing the head lamps and actuating means connected with the steering gear for turning the front wheels of the vehicle.

Fig. 2 is a sectional side elevation on dotted line 2—2 of Fig. 1 showing one of the head lamps supported to turn on a vertical axis in a sleeve on the frame of the vehicle and carrying an arm pivotally connected with an actuating rod having a slidable and pivotal connection with the cross connecting rod of the steering gear.

Fig. 3 is a vertical sectional detail view through the lamp bracket stem and its supporting sleeve showing an interposed retracting spring for returning the lamp to the normal position.

Fig. 4 is an elevation of the front portion of the vehicle with the head lamps mounted thereon in the normal position, showing the actuating rods connected therewith and slidably and pivotally connected with the cross connecting rod of the steering gear.

Fig. 5 is a plan or diagrammatic view of the forward portion of the vehicle and lamp controlling mechanism indicating by dotted lines an actuated position of the steering gear and the relative projection of the rays of light from the lamps.

Referring to the parts of the mechanism by the characters of reference on the drawings, 1 represents the side rails of the vehicle frame which are mounted upon springs 2 clipped in the usual way to the front wheel axle 3, the wheels 4 of which are journaled upon knuckles pivoted to swing on vertical axes in the ends of said axle, and said knuckles are provided with swinging arms 5 which are coupled together by a cross connecting rod 6 and to an operating rod 7 leading to and connecting with the steering wheel mast, (not shown) which is commonly employed in connection with the above described arrangement for controlling the wheels in directing the course of the vehicle.

Secured to the side rails near the forward end of the frame are socket fittings 8 carrying vertically extending sleeves 9 through which the tubular stems 10 of the forked head lamp brackets 11 extend respectively, the lamps 12 being mounted in the usual way between the forks of said brackets. The hub 13 of each bracket, from which the forks extend, receives and is secured to the upper screw threaded end of a tubular stem 10 by a binding nut 14, and the lower end of said hub is tapered and seated to turn on a bearing ring 15 mounted in the upper end of the sleeve 9. A coiled spring 16 embracing the stem within the sleeve, and which is secured thereto and to said sleeve at opposite ends respectively, as at 17 and 18, serves to yieldably restrain said stem against a turning movement in one direction and to impart movement thereto in the opposite direction. The lower end of this stem is screwthreaded through a boss 19 which engages the lower end of the sleeve 9 and receives the screwthreaded end of a laterally projecting, horizontally swinging arm 20, by which said stem is turned against the tension of the spring 16, and which is held by said spring parallel with the frame and normally engaged with a depending lug 21 on the bracket 8 forming a limiting stop to retain the lamp in the set position of alinement with the vehicle. (See Fig. 3).

The mechanism for operating the lamps to turn them independently and alternately in opposite directions, respectively, corresponding to the course of the vehicle as directed by the operation of the steering gear, consists of a pair of actuating rods 22 each of which is provided at one end with a socket 23 for the reception of a ball 24 on the angular end of the arm 20 which extends through a lateral opening 25 in the wall of said socket and by which a universal pivotal connection is effected between said arm and rod, as best shown in Fig. 3. The opposite ends of the rods which are offset, as shown in Fig. 4, extend inwardly toward each other from their respective lamp turning arms 20, and normally lie parallel with and above the cross connecting rod 6. Fixedly secured to each of the rods 22 intermediate its ends is a collar 26 which normally abuts against the outer end of a coupling sleeve 27 through which the inner end of said rod slidably extends, and depending from the under side of said sleeve is a ball headed stem 28 which is pivotally received in a socket formed between the upper ends of a divided clamp 29, the two parts of which embrace and are fixedly secured by bolts 30 to the cross rod 6 connecting the turning arms of the wheels of the vehicle.

By this arrangement a flexible driving connection is established between the lamp-turning arms and the connecting rod of the wheel-turning arms, which permits of relative vertical movement of the parts so connected to allow for the spring action of the vehicle frame without disturbing the set position of the lamps, and through the longitudinal movement of the cross connecting rod in turning the wheels in either direction one of the actuating rods 22 will be caused, by the engagement of its sleeve 27 with the collar 26 thereon, to move in the direction of the movement of said cross rod and to turn the arm 20 of the stem 16 of the lamp with which it is connected against the tension of the spring 16 and swing said lamp in a direction corresponding to the angular position of the wheels and the deflected course of the vehicle, while the sleeve 27 of the actuating rod of the opposite lamp will be caused to slide toward the inner end of said rod and out of engagement with the collar thereon so that said lamp will be uneffected by movement of the cross rod in actuating the companion lamp, and will remain in its set position. The alternate movement of the lamps relative to the course of the vehicle is such that when the vehicle wheels are turned to the right, as indicated by dotted lines in Fig. 5, the left hand lamp will be turned toward the right and at an angle to the right hand lamp in its normally standing position, so that the rays of light from both lamps will be caused to converge toward a point on the roadway in advance of the vehicle along the outermost arc of the turning course, and as the wheels are returned to position to straighten the course of the vehicle the actuated lamp will be restored by the retracting action of its spring to the normal position, in which the arm of the lamp will be retained in engagement with the limiting stop of its supporting bracket. It will be apparent that the turning movement of the wheels to the left will effect the operation of the right hand lamp relative to the course of the vehicle and to the set position of the left hand lamp in a manner corresponding to the reverse operation above described.

To enable either of the lamps to be operated manually and independently of the steering gear, preferably the lamp on the left or driver's side of the vehicle (see Figs. 1 and 2), the lower end of the stem 10 of this lamp may be provided with a laterally projecting horizontally swinging arm 31 so positioned as to extend inwardly of the axis of the lamp with respect to the frame. To the outer end of said arm a cable 32, extended through the dash 33 of the vehicle, may be attached at one end and provided at its opposite end with a handle or pull 34 accessible to the driver who may by drawing upon the pull and cable effect the swinging of the arm and the turning of the lamp in a manner to direct the rays of light at an angle toward the right of the roadway so as to deflect the glare in a direction to avoid interfering with the vision of the occupants of an approaching or passing vehicle. It will be understood that in this operation the actuating rod will slide outwardly carrying the collar thereon out of engagement with its coupling sleeve, and that when the cable is released the lamp will be returned by the pressure of its spring, and the collar will be restored to engagement with the coupling sleeve bringing the parts into position to be actuated by the connecting rod of the steering gear.

It is obvious that changes may be made in the structural details without departing from the essential features herein disclosed, and the invention is presented to include all such changes and modifications as properly come within the scope and meaning of the appended claims.

I claim:

1. In a head-lamp control for motor vehicles, the combination with the cross connecting rod of the steering gear of the vehicle, of a pair of lamps spaced in alinement transversely of said vehicle and journaled thereon to turn each toward the other upon vertical axes, yieldable retracting means to retain said lamps in normal alinement, actuating members pivotally connected eccentrically to the axes of said lamps respectively and extending therefrom in adjacent parallel alinement with said connecting rod, and coupling members pivotally carried by said connecting rod slidably receiving said actuating members and operably engageable therewith respectively and alternately with movement of said rod in opposite directions for imparting movement to turn said lamps independently one toward the other and in a direction corresponding with the deflected course of the vehicle.

2. In a head-lamp control for motor vehicles, the combination with the cross connecting rod of the steering gear of the vehicle, of a pair of lamps spaced in alinement transversely of said vehicle and having vertically journaled stems respectively on which said lamps are adapted to turn toward each other, yieldable retracting members connected with said stems respectively to retain said lamps in normal alinement, actuating members pivotally connected eccentrically to said stems respectively and extending therefrom in opposed adjacent longitudinal alinement parallel with said connecting rod, stops on said actuating members, and coupling members pivotally carried by said connecting rod slidably embracing said actuating members respectively between said stops and engageable therewith correspondingly through movement of said connecting rod in opposite directions for imparting movement to turn said lamps alternately one toward the other and in a direction corresponding with the deflected course of the vehicle.

3. In a head-lamp control for motor vehicles, the combination with the cross connecting rod of the steering gear of the vehicle, of a pair of lamps spaced in alinement transversely of said vehicle and journaled thereon to turn toward each other upon vertical axes, yieldable retracting means coöperating with limiting stops to return and retain said lamps in normal alinement, actuating members pivotally connected eccentrically to the axes of said lamps respectively and extending therefrom in adjacent parallel alinement with said connecting rod, means pivotally and slidably coupling said connecting rod with said actuating members respectively and operably engageable therewith independently and correspondingly with movement of said rod in opposite directions for imparting movement to turn said lamps alternately one toward the other and in a direction corresponding with the deflected course of the vehicle, and manually operable means for actuating either of said lamps to turn it toward the other.

4. In a head lamp control for motor vehicles, the combination with the cross connecting rod of the steering gear of the vehicle, of a lamp journaled to turn upon a vertical stem supported upon one side of said vehicle, an arm on said stem, a limiting stop for said arm, retracting means to yieldably restrain said arm engaged with said stop to retain said lamp normally alined with said vehicle, an actuating rod pivotally connected to said arm and extending therefrom in adjacent parallel alinement with said connecting rod, a collar on said actuating rod, a coupling sleeve on said actuating rod pivotally connected with said connecting rod and engageable with said collar through the movement of said rod in one direction to impart movement to turn said lamp in a direction corresponding with the deflected course of the vehicle and inoperative to actuate said lamp through the movement of said connecting rod in an opposite direction, and manually operable means for imparting movement to swing said arm and turn said lamp toward the opposite side of said vehicle.

5. In a head-lamp control for motor vehicles, the combination with the cross connecting rod for turning the front wheels of the vehicle, of a pair of lamps spaced in alinement transversely of said vehicle and having vertically journaled stems respectively on which said lamps are supported to turn toward each other, means to retract and limit the return movement of said lamps respectively to normal alinement, actuating rods pivotally connected eccentrically to said stems respectively and extending toward each other parallel with and adjacent said connecting rod, and coupling members slidably and pivotally connecting said actuating rods independently operable with said connecting rod for receiving the movement thereof alternately with the turning of the wheels in opposite directions to turn said lamps correspondingly one toward the other and in the direction of the course of the vehicle.

6. In a head-lamp control for motor vehicles, the combination with the connecting rod for turning the front wheels of the vehicle, of a pair of lamps spaced in alinement transversely of said vehicle and having vertically journaled stems respectively on which said lamps are adapted to turn toward each other, yieldable retracting means connected with said stems respectively to return and retain said lamps in normal alinement, actuating members pivotally connected eccentrically to said stems respectively and extending therefrom in opposed longitudinal alinement paralled with and adjacent said connecting rod, coupling members pivotally carried by said connecting rod slidably receiving said actuating members respectively and engageable therewith for imparting movement to turn said lamps alternately with movement of said rod in opposite directions, and manually operable means for actuating either of said lamps independently.

In testimony whereof I sign this specification.

J ALBERT JONES.